Sept. 6, 1966

J. A. McDOUGAL

ARRANGEMENT FOR CONNECTING ELECTRICAL CONTROLS TO PRINTED CIRCUITS

Filed Dec. 29, 1964

3,271,627

INVENTOR.
JOHN A. McDOUGAL
BY C. R. Meland
HIS ATTORNEY 3,271,627
ARRANGEMENT FOR CONNECTING ELECTRICAL CONTROLS TO PRINTED CIRCUITS John A. McDougal, Flint, Mich., assignor to General Motors Corporation, Detroit, Mich., a corporation of Delaware Filed Dec. 29, 1964, Ser. No. 421,891
10 Claims. (Cl. 317—112)

This invention relates to an arrangement for connecting an electric control to a printed circuit and more particularly to an arrangement for connecting a switch to the instrument panel of a motor vehicle.

Electrical switches such as ignition switches, headlight switches and windshield wiper switches are ordinarily mounted in a motor vehicle by supporting them from the dash of the vehicle. These switches normally carry terminals at the back sides of the switches which are connected with the wiring located behind the dash. Although this type of supporting arrangement for motor vehicle switches has been satisfactory, it requires a large number of electrical connections with the ever present possibility of making an error in wiring where a number of terminals connected with loose wires must be inserted in proper positions in a plastic connector body which assembly is subsequently mated with the fixed terminals of a switch.

The present invention in contrast to known methods of mounting the control switches of a motor vehicle is directed to an arrangement where the instrument panel includes a printed circuit and where the control switches are provided with terminals which directly contact the printed circuit conductors when the switch is mounted in place.

It accordingly is one of the objects of this invention to provide a switch mounting arrangement for a motor vehicle where reduced assembly time is achieved, elimination of wiring errors is achieved and a general reduction in cost is achieved both during initial assembly and during service when it is required.

Another object of this invention is to provide a switch mounting arrangement where the switch is supported in such a manner that the contacts of the switch directly engage printed circuit conductors that form a part of an instrument panel for a motor vehicle.

Still another object of this invention is to provide a contact arrangement for an electrical control where the control is connected to a printed circuit and where the control has three rigid contacts mounted in a tripod arrangement and a plurality of other resilient contacts all of which engage the printed circuit conductors of a printed circuit member. In carrying this object forward, the electrical control, which may be a switch, is held to the printed circuit member by a primary resilient means and a secondary resilient means which comprises the resilient contacts of the electrical control when they engage the printed circuit member. This primary resilient means may take the form of a lock washer or may be a coil spring.

Further objects and advantages of the present invention will be apparent from the following description, reference being had to the accompanying drawings wherein preferred embodiments of the present invention are clearly shown.

Figures 1, 2, 3, 4:
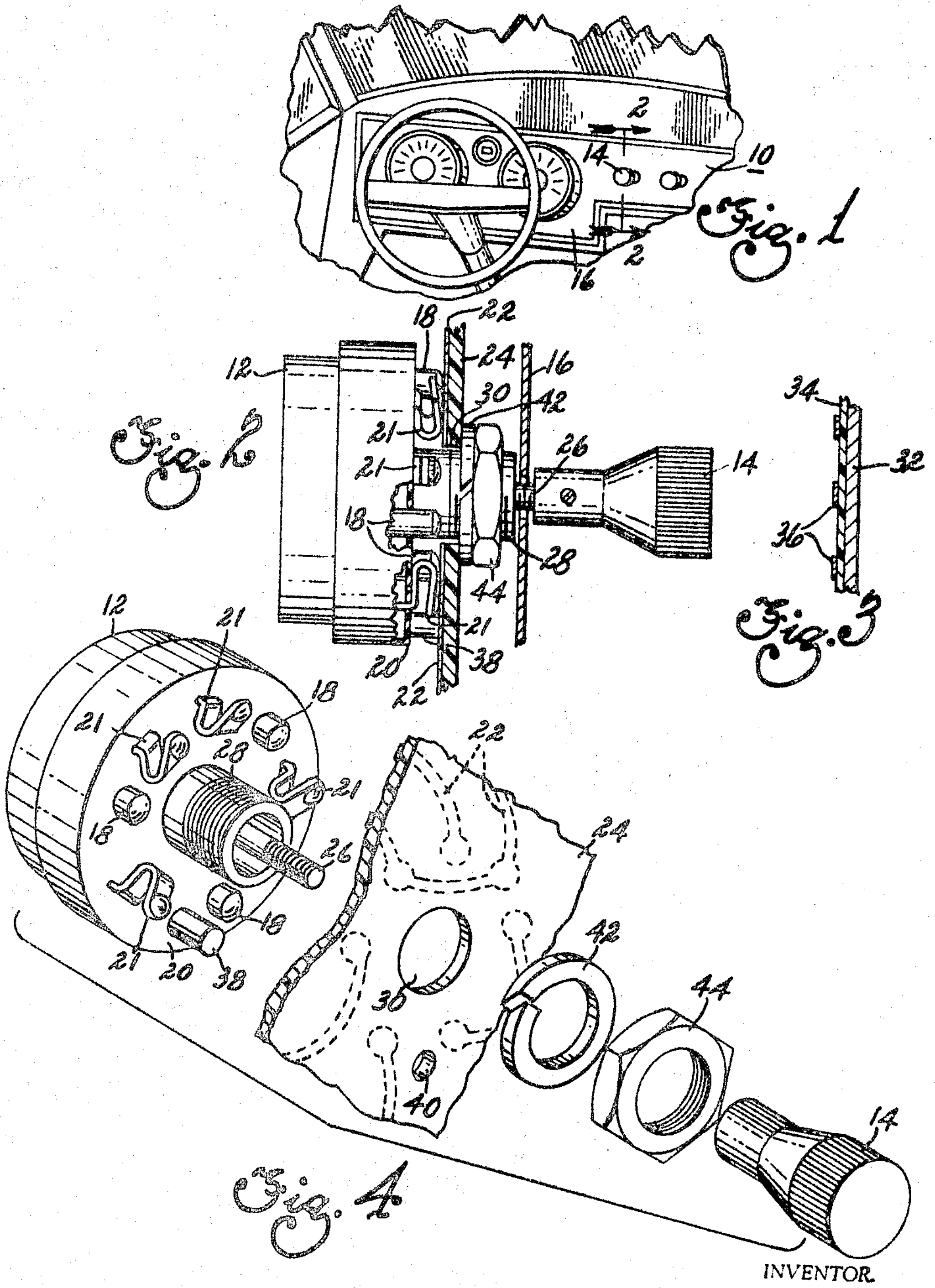
FIGURE 1 is a view illustrating an instrument panel in a motor vehicle.
FIGURE 2 is a view partly in section taken along line 2—2 of FIGURE 1.
FIGURE 3 is a sectional view of a printed circuit which can be used in place of the printed circuit shown in FIGURE 2.
FIGURE 4 is a perspective view of a switch and printed circuit prior to assembly.

Referring now to the drawings and more particularly to FIGURE 1, the reference numeral 10 generally designates an instrument panel for a motor vehicle. This instrument panel supports the usual elements such as a speedometer and a control switch which in this case, is a headlight switch. The control switch is operated by a knob 14.

The instrument panel includes a decorative panel 16 through which extends the actuating shaft of the switch connected with knob 14 in a manner illustrated in FIGURE 2. This decorative panel is suitably supported by the instrument panel assembly.

Referring now more particularly to FIGURES 2 and 3, it is seen that the switch 12 has a plurality of contacts 18 which extend through the forward end 20 of the switch housing. There are three contacts 18 positioned such that they form a tripod. The contacts 18 are rigidly fixed to the switch housing in any suitable manner and are formed as rigid contacts. The switch 12 also has a plurality of contacts 21. The contacts 21 are also fixed with respect to the switch housing but these contacts rather than being rigid are resilient and as shown in the drawing, are formed of U-shaped spring metal material.

The contacts 18 and 21 engage printed circuit conductors 22 located on a printed circuit board 24 which is formed of insulating material. The printed circuit conductors 22 are arranged so that they contact the contacts 18 and 21 when the switch is mounted to the printed circuit board.

The contacts 18 and 21 are connected with the internal parts of the switch (not shown) and are connected with fixed contacts located within the switch. These fixed contacts are bridged in a conventional manner by one or more contactors (not shown) that are shifted by a contact carrier or other arrangement driven by a shaft 26. The shaft 26 is suitably supported by the switch housing and the switch housing carries a threaded extension 28 which passes through an opening 30 formed in the printed circuit board 24.

In the FIGURE 2 arrangement, the printed circuit board 24 may be formed of relatively rigid insulating material which directly carries the printed circuit conductors 22. An alternative printed circuit arrangement is illustrated in FIGURE 3 where the printed circuit panel includes a rigid panel 32 which carries a sheet of flexible plastic insulating material 34 having printed circuit conductors 36. In this arrangement, the printed circuit conductors 36 are bonded or otherwise integrated to the flexible plastic material 34 and the material 34 is then adhesively secured to the rigid panel 32. The rigid panel 32 can be a part fixed to a part of the dash of a motor vehicle and could be formed of metal. The advantage of the FIGURE 3 arrangement is that the sheet of material 34 with its printed circuit 36 can be applied across the entire instrument panel and can be folded around corners where appropriate.

It is to be understood that the FIGURE 2 and FIGURE 3 arrangements are alternative arrangements and when using the arrangement shown in FIGURE 2, the rigid panel 24 is a fixed part of the instrument panel and can be, for example, secured to a case of a conventional instrument cluster. In the FIGURE 3 arrangement, the panel 32 takes the place of panel 24 shown in FIGURE 2 and the flexible printed circuit 34 is then applied directly to the rigid panel which as noted above could be metal.

In assembling the switch 12 to the printed circuit panel 24, the locating pin 38 which is integral with the front face of the switch housing is aligned with the hole 40 formed in the printed circuit panel 24. This positively positions the switch 12 relative to the printed circuit board 24 so that the contacts of the switch will engage the correct printed circuit conductors. The threaded extension 28 passes through the opening 30 formed in the printed circuit board 24 and also passes through a spring type lock washer 42. A nut 44 engages the lock washer when the nut is tightened on the threaded extension 28 of the switch housing. After the switch is assembled to the printed circuit board 24, the actuating knob 14 is secured to the switch actuating shaft 26.

The lock washer 42 is a primary resilient member which urges the switch 12 toward the printed circuit board 24. This force tends to compress the resilient contacts 21 while holding the three contacts 18 in tight engagement with the printed circuit board 24. The tripod arrangement of the contacts 18 prevents tilting movement of the switch 12 where the switch may be mounted on somewhat uneven surfaces of the printed circuit panel. It is possible to use a compression spring in place of the lock washer 42 to provide the force for urging the switch 12 tightly against one side of the printed circuit panel 24 which should be of sufficient force to slightly compress the resilient contacts 21.

The rigid contacts 18 can be called primary contacts and are used in circuits that require the greatest contact pressure between the switch contacts and the printed circuit conductors. The resilient contacts 21 can be called the secondary contacts since they are used where less pressure is required between the contacts of the switch and the printed circuit conductors.

While the embodiments of the present invention as herein disclosed constitute a preferred form, it is to be understood that other forms might be adopted.

I claim:

1. In combination, a panel including a printed circuit, an electrical control device disposed on one side of said panel, said control device having a plurality of rigid contacts and a plurality of resilient contacts engaging said printed circuit conductors, and resilient means on an opposite side of said panel for urging said rigid and resilient contacts into tight engagement with said printed circuit conductors.

2. The combination according to claim 1 where the panel is a part of an instrument panel for a motor vehicle.

3. The combination according to claim 1 where the panel forms a part of an instrument panel on a motor vehicle and where the electrical control device is a switch for controlling electrical circuits on a motor vehicle.

4. The combination according to claim 1 where the electrical control device and the panel have cooperating locating means.

5. The combination according to claim 1 where the rigid contacts are located in a tripod arrangement.

6. The combination according to claim 1 where the printed circuit means includes a flexible insulator carrying printed circuit conductors which is secured to a rigid panel.

7. An arrangement for mounting an electric switch in a motor vehicle comprising, a panel means forming part of an instrument panel for a motor vehicle, printed circuit means carried by said panel means, an opening in said panel means, a control switch for controlling electric circuits on a motor vehicle, said control switch having a plurality of contacts extending from one end of said switch, said contacts engaging said printed circuit means, said control switch having a threaded extension extending in the same direction as said contacts and passing through an opening formed in said panel, means engaging said threaded extension for holding said control switch in place, and resilient means interposed between said last-named means and said panel for urging said contacts into tight engagement with said printed circuit means.

8. The combination according to claim 9 where the contacts carried by the control switch include a plurality of rigid contacts and a plurality of resilient contacts.

9. The combination according to claim 7 where the printed circuit means is on a flexible inuslator which is carried by a rigid panel.

10. The combination according to claim 7 where the control switch has three rigid contacts located in a tripod arrangement.

References Cited by the Examiner

UNITED STATES PATENTS 2,066,511 5/1937 Arlt ---------------- 174—68.5

ROBERT K. SCHAEFER, *Primary Examiner.*

M. GINSBURG, *Assistant Examiner.*